(No Model.)
H. FOWELL.
AERATOR.
No. 526,998.
Patented Oct. 2, 1894.
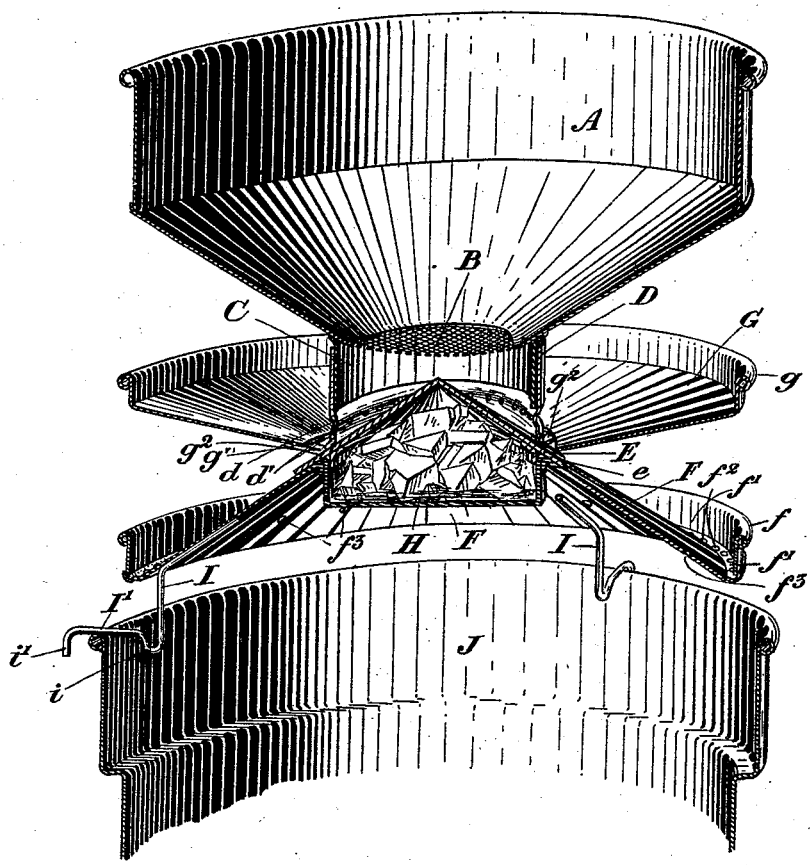
Witnesses
Inventor
Harry Fowell
by Fetherstonhaugh & Co
Attys

UNITED STATES PATENT OFFICE.

HARRY FOWELL, OF BELLEVILLE, CANADA.

AERATOR.

SPECIFICATION forming part of Letters Patent No. 526,998, dated October 2, 1894.

Application filed March 2, 1894. Serial No. 502,044. (No model.) Patented in Canada March 3, 1892, No. 38,394.

*To all whom it may concern:*

Be it known that I, HARRY FOWELL, of the city of Belleville, in the county of Hastings, in the Province of Ontario, Canada, have invented certain new and useful Improvements in Aerators, (for which I have obtained Letters Patent in Canada dated March 3, 1892, No. 38,394,) of which the following is a specification.

My invention relates to improvements in aerators for milk and the object of the invention is to devise an aerator particularly adapted for straining and aerating milk, which is designed to be put in cans and it consists essentially of an aerating apparatus comprised of a receptacle to receive and strain the milk and saucer-shaped and conical deflecting plates for aerating the milk, which are connected to the bottom of the receiving receptacle and are designed to aerate and distribute the milk, the apparatus being supported on legs of peculiar construction, which rest upon the top of the can and are adapted to fit different diameters of cans and the whole being arranged and constructed in detail as hereinafter more particularly explained.

The drawing represents a sectional perspective veiw through my aerator showing it placed in position on the top of a milk can.

A, is the receptacle into which the milk is poured. The bottom of the receptacle is funnel shaped and provided with a strainer, B, and has attached to it a cylindrical bottom collar, C. This collar fits within the collar, D, attached to or forming part of the conical cap, E, which forms the apex of the conical deflecting plate, F.

$d$, is an inwardly extending bead formed around the collar, D, and having a series of holes or perforations, $d'$, made around it.

G, is an upwardly flaring saucer shaped deflector, which is provided at its outer end with a vertical rim, $g$, and at the inner end has an opening, $g'$, which is equi-distant from the collar, D, and is supported above the conical deflecting plate, F, by the legs, $g''$.

H, is a receptacle designed to receive ice, attached to and forming part of the conical deflecting plate, F, and situated beneath the conical cap, E. The conical cap, E, is provided with an angular ring, $e$, by which it is held securely in position above the center of the receptacle, H. The conical deflecting plate, F, is provided with a vertical rim, $f$, which forms a trough, $f'$, the bottom of which is provided with a series of holes or perforations, $f''$, throughout.

$f'''$, are holes or perforations made around the conical deflecting plate below the level of the top of the vertical rim, F. These supplemental perforations are designed to prevent any possibility of the milk over-flowing the top of the vertical rim, $f$, and also to hold a quantity of the milk around the rim to allow of further aeration by the down pour of milk into the body of milk retained and so to allow of its cooling.

I, are legs, the tops of which are secured beneath the conical deflecting plate, F. The legs, I, extend downwardly and form a stop, $i$, at the inner end and then outwardly at a slight upward incline and form a stop, $i'$, at the outer end. The outwardly extending portion, I', of the legs, I, rests upon the top of the can, J, and thereby supports the aerator apparatus, which is of less diameter than the top of the can, so that the downward pour of milk from the apparatus will fall into the can. It will also be seen that the outwardly extending portion, I, of the legs enables me to adapt my aerator to different diameters of cans.

Having now described the principal parts involved in my invention I shall briefly describe its operation.

The milk is poured into the receptacle, A, and passes through the strainer, B, into the collar, D, and through the perforations $d'$, in the bead, $d$, of the collar, D. The perforations, $d'$, are preferably made at the lower portion of the bead and inclined slightly upwardly so that the weight of the milk in the receptacle, A, will force the milk in separate streams through the perforations outwardly and upwardly upon the deflecting plate, F, from which it will pass down and inwardly again through the opening, $g'$, and down the conical deflecting plate, F, at the bottom end of which the milk will pass through the perforations, $f$, and pour downwardly into the can. It will now be seen that the milk will be aerated in its passage outwardly and inwardly in the saucer shaped deflecting plate, G, and as it falls from the plate, G, to the plate, F, also on its passage down the conical deflecting plate, F, and as it pours down from the perforations, f', into the can, thus serving to thoroughly aerate and remove all germs from the milk before it reaches the can in which it is to be shipped. It will also be seen that if I provide the ice receptacle H, as shown that the milk will be cooled thus helping to preserve it.

Although I show a saucer shaped deflecting plate, G, it will of course be understood that this might be dispensed with and the perforations, d', in the bead, d, arranged so as to cause the milk to flow in separate streams down the conical deflecting plate, F, but I prefer to use the deflecting plate, G, as by this means I provide for a much more thorough aeration of the milk.

The manner in which the parts of my aerating apparatus are connected together will be found very convenient as I can very readily separate the parts for thoroughly cleansing the apparatus. The collar, C, of the receptacle, A, fits within the collar, D, which is preferably attached to or forms part of the conical cap, E, or if the conical plate, F, is formed without any ice receptacle the collar, D, is attached to or forms part of the conical plate F. As shown in the drawing, however, the collar, D, forms part of the conical cap, E, which it will be seen may be removed from the top of the conical deflecting plate so as to place the ice in the receptacle, H.

It will be noticed that the outer edge of the conical cap extends over the top of the conical plate, F, considerably beyond the edge of the opening at the top of the receptacle, H, so that there is no danger of any milk finding its way into the ice receptacle as it flows down.

I preferably make the downwardly extending portion of the legs, I, with a slightly upward incline so as to cause any milk that may drop on it to run into the can. Although I show an annular opening at the inner end of the saucer shaped deflecting plate, G, and support the plate above the conical plate, F, by legs, g, it will be understood that the inner edge of the plate might fit the collar snugly and have a row of perforations made near it as an alternative. Again as the top or lid of an ordinary transporting can is the same form as the receptacle, A, when inverted it will be readily seen that such top when provided with a strainer will be equivalent to the receptacle, A, with its strainer, B, and collar, C. On this account in very many instances it will be unnecessary to manufacture this portion of my aerator and consequently the cost of manufacture will be much reduced.

What I claim as my invention is—

1. In an aerator the combination with the strainer provided with a tapering bottom and a collar extending down from the bottom, of a conical deflecting plate provided at the top with an upwardly extending cylindrical collar having an inwardly extending bead formed around it and perforations made in the bead, and at the bottom edge with a vertical rim and perforations situated at the bottom of the conical portion within the rim, and a saucer shaped deflecting plate provided at its outer edge with a vertical rim and having its inner ends supported above the conical plate, F, beneath the perforations in the collar, D, so as to form an annular opening around the collar as and for the purpose specified.

2. In combination, the truncated conical deflector, the ice receptacle suspended beneath the truncated portion, the conical cap covering the opening to said receptacle, an annular collar projecting from said cap having an inwardly projecting perforated bead, and a strainer having a downwardly projecting flange fitting said collar and supported by the bead, substantially as described.

H. FOWELL.

Witnesses:
KATHLEEN MCGOWAN,
JAMES A. ROSE.